United States Patent Office 2,886,712
Patented May 12, 1959

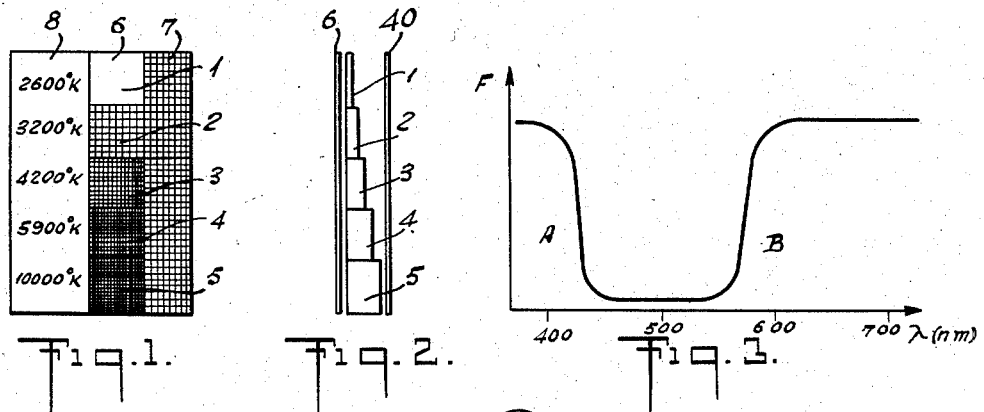
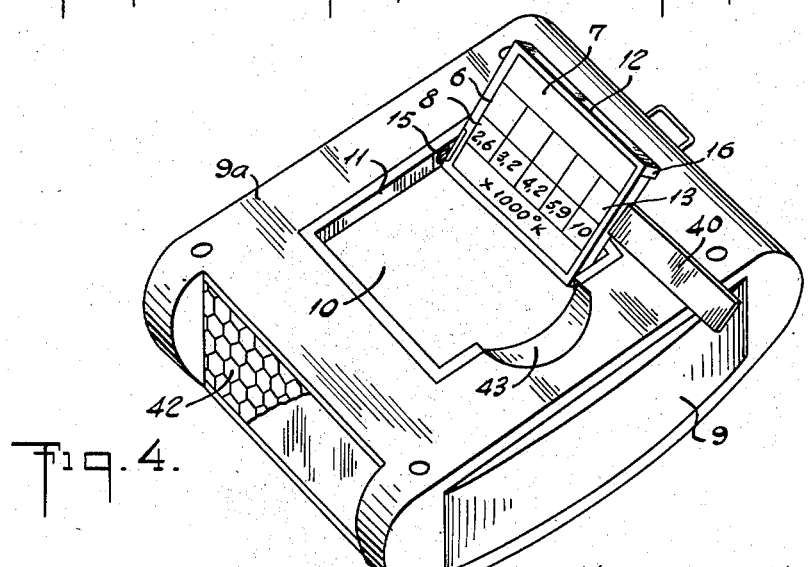
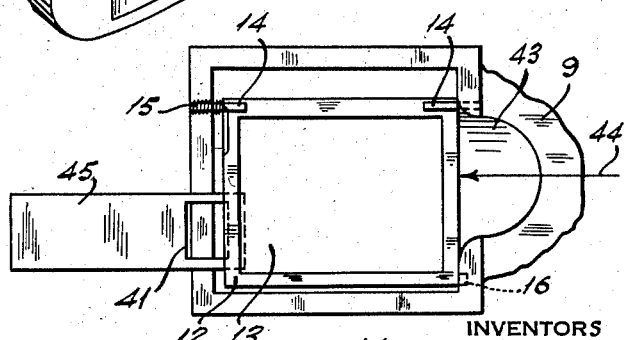

2,886,712

APPARATUS FOR DETERMINING THE COLOR TEMPERATURE OF A SOURCE OF LIGHT

Werner Schultze, Ludwigshafen, and Hans Gossen, Erlangen, Germany, assignors to P. Gossen & Co. G.m.b.H., Erlangen, Germany, a firm Application March 25, 1954, Serial No. 418,696

Claims priority, application Germany March 13, 1954

5 Claims. (Cl. 250—71)

This invention relates to a method and apparatus for determining the color of a source of light or its color temperature, i.e. the temperature of an incandescent black body which is a match for the given color.

It is an object of the present invention to provide simple means and method steps for facilitating such colorimetric measurements.

A special object of the invention is to provide a device permitting such measurements of the color temperature in a foolproof manner by photographic amateurs for determining the proper data for exposure in case of color photography.

Still another object of the invention is to provide a combined photographic exposure meter and color temperature indicator.

With this and other objects in view, this invention consists in the details of construction, combination of elements and operation hereinafter set forth and then specifically designated by the claims.

Figure 6:
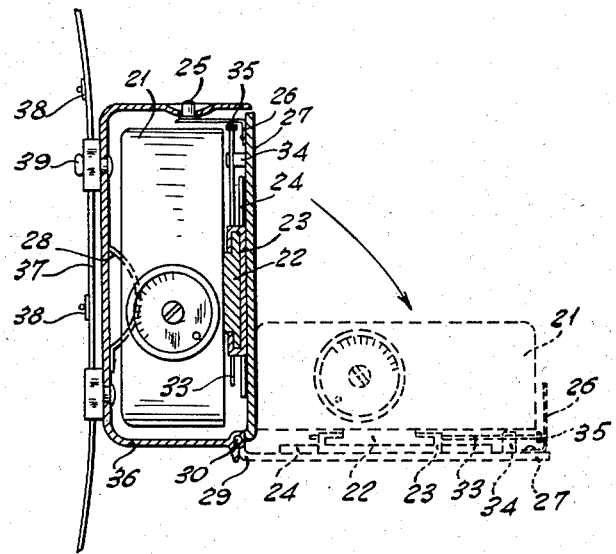
Figure 7:
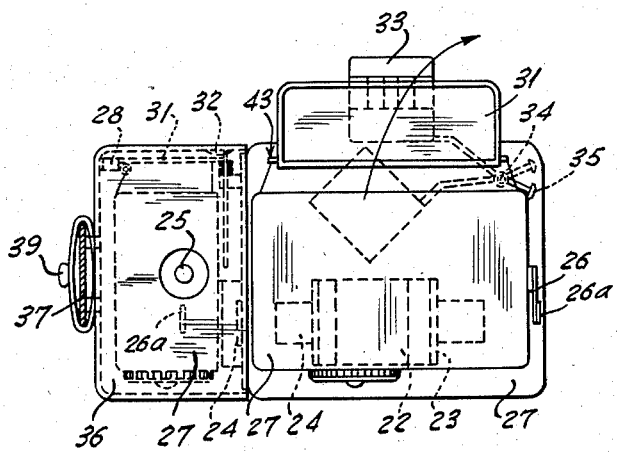

In order that those skilled in the art to which this invention appertains may understand how to make and use the same, we will describe its construction in detail, referring by numerals to the accompanying drawings forming part of this application, in which:

Fig. 1 is a front view of a color temperature indicator,

Fig. 2 is a diagrammatic side view thereof, with exaggerated thickness of the filter means, Fig. 3 is a filter characteristic, Fig. 4 is a perspective view of a combined exposure meter and color temperature indicator having the invention applied thereto, Fig. 5 is a fragmentary plan view of Fig. 4, Fig. 6 is a side view of a combined exposure meter and color temperature indicator adapted to be attached to a photographic camera, in an open condition, and Fig. 7 is a plan view thereof.

Similar reference numerals denote similar parts in the different views.

Before referring to the drawings in greater detail, the physical principles underlying the present invention will be hereinafter explained in a general way.

The present invention is based on the effect of daylight fluorescence and permits in a technically simple way to determine the color of the color temperature of a source of light by comparing a daylight fluorescence color and an ordinary light reflecting color illuminated by the same source of light without requiring any spectral analysis of the source of light to be measured.

As is well known, fluorescence is the absorption of radiation of a particular wavelength by a substance and its remission as light of greater wavelength. Thus, daylight fluorescence colors not only remit the incident light like ordinary colors, but a fluorescence light is superposed to such remission. For instance, by an ordinary yellow color the violet and blue share of the incident light is remitted to a small extent only, while most of the green, yellow and red components is remitted, whereby the effect of a yellow color is produced. The non-remitted components are absorbed, i.e. finally transformed into heat. A yellow daylight fluorescence color also remits only a small part in the violet and blue range of the spectrum, whereas most of the incident light is remitted in the green, yellow and red ranges. However, only a part of the violet and blue radiation is absorbed, while a substantial portion is re-emitted in the form of a green, yellow, and red radiation. In this manner in these spectral ranges a remission caused by fluorescence is superposed to the normal remission. Both these remissions together may exceed considerably the value 1 in certain ranges of the spectrum. Such a color, therefore, shows an unusual brightness in case of a high saturation. In case of red daylight fluorescence colors not only the violet and blue but also the green components of the incident light are transformed into red fluorescence radiation to a considerable extent.

Thus, if in the incident light the short wave portion becomes less, the fluorescence effect also must be less, i.e., the difference of brightness between a daylight fluorescence color and an ordinary color will be reduced.

Thus it would be theoretically possible to determine the color temperature by comparing a normal color and a fluorescence color, for instance, rhodamin (such as "Rhodamin B extra," mentioned in Schultz "Farbstofftabellen, 1931, No. 864) arranged side by side. If the incident light has a high color temperature, i.e., a high share of short wave light, the difference of brightness between the two colors will be very high. If the light has a lower color temperature, the difference will be much less. Thus, conclusions regarding the color temperature can be drawn from the amount of the difference of brightness. However, by experience it is rather difficult for the human eye to evaluate differences of brightness. On the other hand the human eye has an amazing ability to determine the matching of brightnesses. This property is utilized by comparing the two illuminated colors as to their brightness, reducing the fluorescence color artificially to the brightness of the color with which it is to be compared. To this end, for instance, a darker pigment may be added or a grey filter may be used. Thus an accurate matching of the two colors can be effected. Thus when the color temperature is increased, the fluorescence color will be brighter than the comparative color, or when it is decreased, the fluorescence color will be darker. Moreover, a scale can be obtained by covering the fluorescence color with a filter representing a grey scale and comparing it with the comparative color arranged side by side therewith. Thus, depending on the color temperature, a definite step of the scale will agree in brightness with the comparative color. This scale can be gauged and the respective color temperatures can be stated near it. According to a further feature of the present invention the scale can be provided with any data required for practical use, by stating, for instance, near the scale the correcting filter required for photographic exposure.

By way of alternative, instead of a stepped scale a continuous scale can be used.

A color temperature indicator of this type is shown by way of example in Figs. 1 and 2. Arranged on a basic sheet are a strip of fluorescence color 6, a strip of comparative ordinary color 7, and a scale 8. The strip 6 is covered with five neutral grey filters 1, 2, 3, 4, and 5 whose density increases in the manner as shown in Fig. 2. The strip 7 is matched with the strip 6 so as to have the same color tone as the fluorescence color 6 in case of the light colors or color temperatures coming into question. If light of different color temperature impinges upon this color temperature indicator, the ratio of the luminous density of the fluorescence color 6 to the luminous density of the comparative color 7 will be different depending on the color temperature. In other words, there is a number of certain kinds of light or color temperature, i.e. five in the example, in which one of the five fields 1 to 5 of the fluorescence color 6 will have the same luminous density as the comparative color 7. For instance, in Fig. 1 the luminous density of the comparative color 7 would be equal to that of field 2 of the fluorescence color. In this case it has been assumed that the corresponding color temperature would be 3200° K. which is indicated on the scale 8.

In order to obtain a stepping of the fields of such a color temperature indicator giving the impression of uniform steps, the single fields of strip 6 are advantageously arranged so as to correspond to color temperatures whose reciprocal values form an arithmetic row, such as indicated, for instance, in Fig. 1. In this case the density values of the corresponding grey filters will also form an arithmetic row and the light densities of the steps of this grey scale in this case are graduated in equal steps according to the sensation of the human eye.

It will be appreciated that with such a color temperature indicator the equality of brightness and so the color temperature can be determined with a degree of safety which increases with the difference in brightness of the fluorescence color in case of its illumination with two different color temperatures.

If the steps of the color temperature are fixed, the stepping or graduation of the grey filters can be made coarser by putting on the fluorescence color a filter 40, Figs. 2 and 4, with a characteristic curve as shown in the diagram of Fig. 3, in which the abscissa indicates the wave length $\lambda(m\mu)$ and the ordinate indicates the intensity I of the light of the respective wave length allowed to pass through the filter, or in other words, the perviousness of the filter. According to Fig. 3, this filter is adapted in such a way that the range of its spectrum which corresponds to the rays causing the fluorescence effect is transparent or diaphanous to such light rays only in the smaller range A reaching to a wave length of e.g. about $\lambda = 420$ m$\mu$, while it is practically non-transparent for wave lengths from 420 to 570 m$\mu$. It will be understood that the spectral share of the short wave light rays thus is changed to a greater extent compared to the red share thereof than without such filter if the color temperature is changed. The difference of brightness in light intensity between two steps thus becomes greater between adjacent steps. On the other hand, the filter must be pervious to light of the wave length remitted by the fluorescence color owing to the fluorescence effect, for instance, as indicated in Fig. 3, for light rays of a wave length above 570 nm. In this way, each field of the reading scale 8 obtains another color temperature value, the single values of color temperature in this case being closer together.

A filter of this kind could either be provided on the fluorescence color of the color temperature indicator from the outset or attached in the form of an additional filter.

The accuracy of reading the color temperature indicator is impaired in some way by the fact that besides the brightness also the shade of the two colors is changed to a somewhat different extent. This difficulty can be removed by assimilating the two illuminated colors to each other also in regard to their shade and saturation. To this end, the fluorescence color and/or the comparative color may be toned by admixing or superposing colors. For instance, and as hereinbefore described, a stepped grey scale may be superposed to the fluorescence color and in the same way a stepped color scale with pale or subdued stepped shades may be superposed to the comparative color, in such a way that the associated corresponding steps arranged side by side when illuminated by a source of light will agree to each other not only as to their brightness or intensity, but also in regard to the color tone and saturation. Thus, the subjective judgment of the user will be considerably more reliable.

According to a further feature of the invention, means may be provided for covering all but one field of the associated fluorescence and comparative color steps, so that the adjacent colors will not disturb the subjective judgment. To this end, for instance, an opaque covering strip 45 having a window 41 corresponding to the size of one of the fields 1, 2, 3, 4, 5 may be inserted into a corresponding slot of the pocket 13 in Figs. 4 and 5 which will be hereinafter described.

It is also possible to provide a color temperature indicator according to the present invention in such a way that sources of light can be judged whose light does not have the spectral composition of a black body radiator. To this end, for instance, further comparative scales with another shading may be used or the fluorescence color and/or the comparative color may be covered with suitable additional filters attached or inserted in the manner of the filter strip 40, Fig. 4, which will be hereinafter described.

Fig. 4 shows a combined exposure meter and color temperature indicator, the latter being shown in greater detail in Fig. 5. Provided on the lower or rear side 9a of the casing 9 of the exposure meter, whose light admission aperture is indicated at 42, is a depression 10 bordered by a frame 11. The fluorescence color 6 with the appertaining filters, the comparative color 7 and the reading scale 8 are provided with a bordering frame 12 and/or embedded in a pocket 13 of a glasslike transparent plastic material in the process of injection moulding of the pocket, and pivoted on pins 14. A spherically rounded depression 43 in the wall 9a of the casing 9 permits to lift the color temperature indicator with the thumb. Provided on the left hand pin 14 is a helical spring 15 one end of which is anchored in the frame 11 while the opposite end thereof is anchored in the frame 12. The spring 15 acts in such a way that on the one hand it biases the indicator into its open position as indicated in Fig. 4, which is defined by engagement of the frame 12 on frame 11 in an inclined position which is favorable for reading, while on the other hand the spring 15 biases the frame 12 in a direction opposed to the arrow 44 in Fig. 5, in such a way that the indicator in its closed condition is retained in the frame 11 by a nose 16 provided on its frame 12. Thus, by a slight pressure in the direction of the arrow the indicator will spring open and—being hit by incident light—it can be easily read off.

Figs. 6 and 7 show the combination of a color temperature indicator 33 with an exposure meter 21 which can be attached to a photographic camera (no shown) and is secured on the sling or strap 37 of the camera by means of a protective casing or pocket 36 which can be secured to the sling in different positions by means of press buttons 38, 39.

The exposure meter 21 is engaged by means of a dovetail-shaped foot member 22 in an adjustable complementary dovetail-shaped "shoe" member 23 which is laterally adjustable on a rail 24 and has the same shape as the conventional dovetail socket provided on the camera for attachment of the exposure meter. By this arrangement it is ensured that the position of the dovetail member 22 which is adapted to the respective type of camera can be retained.

The shoe member 23 is secured to a cover 27 which is hinged to the casing or pocket 36 at 30 and held in its closed position by a spring-acted locking device 26, 26a which can be released by pressure on the button 25, whereby the cover 27 with the exposure meter 21 can be swung out in the direction of the arrow by action of a spring 28 into its end position defined by a stop 29. The same spring pressure, however, also acts on the upper edge of a diffusor 31 provided for "light measurement." This spring pressure also exceeds the retaining force of the catch so that on swinging out of the exposure meter the diffusor 31 also will be swung out automatically. On inward swinging of the exposure meter a guide curve 32 causes the diffusor to place itself before the light admission aperture 43. In order to carry out the "light measurement," the diffusor 31 is swung before the light admission aperture where it snaps in by a catch (not shown).

The color temperature indicator 33 is swingable about a pivot 34. In its inward position it is disposed in the free space between the exposure meter 21 and the cover 27. For determining the color temperature the indicator 33 is swung out, by means of a knob 35, in the direction of the arrow in Fig. 7, into the position shown in Fig. 7 in full lines and the diffusor 31 is folded to the casing. In order to attach the exposure meter 21 to a camera, its foot member 22 is disengaged from the complementary shoe 23 and engaged in a similar shoe member of the camera.

It will be understood that the color temperature indicator shown in Fig. 5 could also be secured to other parts of the exposure meter or of a camera, or it may be carried separately on an ear loop or chain.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. A device for measuring the color temperature of a source of light comprising a supporting means carrying two strips in adjacent and parallel position, one of said strips being covered with a daylight fluorescence color which reflects from the light incident thereon the color which it fluoresces and strongly absorbs all the other colors, the other of said two strips being covered with a non-fluorescing color of the same chromaticity, further comprising means for gradually modifying the brightness of at least one of said color strips, and a reading scale along the strips.

2. A device for measuring the color temperature of a source of light according to claim 1, said means for gradually modifying the brightness of at least one of said color strips consisting of a neutral gray step wedge.

3. A device for measuring the color temperature of a source of light comprising a frame, a strip covered with a daylight fluorescence color which reflects from the light incident thereon the color which it fluoresces and strongly absorbs all the other colors, a strip covered with a non-fluorescing color of the same chromaticity, said two strips being arranged in said frame in adjacent and parallel position to each other, means for modifying at least one of said strips to form successive areas of increasing brightness and of equal dimensions, an apertured strip slidably mounted in a slit provided in said frame and adapted to be moved in the longitudinal direction over at least that color strip which exhibits successive areas of increasing brightness, the width of the aperture in the strip in the direction of the long side of the strip being exactly that of said successive areas, and a reading scale along the color strips.

4. A device for measuring the color temperature of a source of light according to claim 1, said fluorescing color strip being covered with a filter which is pervious substantially only for the short wave lengths of the range of fluoro-activating wave lengths, and for the longer wave lengths emitted by fluorescence, while at least substantially weakening the wave lengths therebetween.

5. A device for measuring the color temperature of a source of light comprising a supporting means carrying two strips in adjacent and parallel position, one of said strips being covered with a daylight fluorescence color which reflects from the light incident thereon only the red portion and strongly absorbs and converts to red fluorescence light all the other colors, the other of said two strips being covered with a non-fluorescing red color of the same chromaticity, further comprising means for gradually modifying the brightness of at least one of said color strips, a filter covering said fluorescent color strip which filter is pervious substantially only for the wave lengths below 420 millimicrons and above 570 millimicrons while at least substantially weakening the wave lengths therebetween, and a reading scale along the strip.

References Cited in the file of this patent

UNITED STATES PATENTS

| | | |
|---|---|---|
| 2,286,779 | Yule | June 16, 1942 |
| 2,551,650 | Urbach | May 8, 1951 |
| 2,620,445 | Tyler | Dec. 2, 1952 |
| 2,642,538 | Urbach | June 16, 1953 |
| 2,673,934 | Friedman | Mar. 30, 1954 |